Jan. 28, 1969  E. M. HOKE  3,424,081
BALE COMPACTING ATTACHMENT FOR BALERS
Filed Jan. 10, 1966  Sheet 1 of 2

Earl M. Hoke
INVENTOR.

BY *Clarence A. O'Brien*
and *Harvey B. Jacobson*
Attorneys

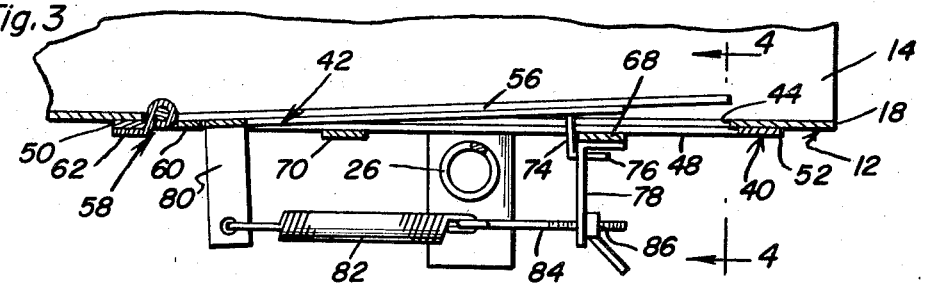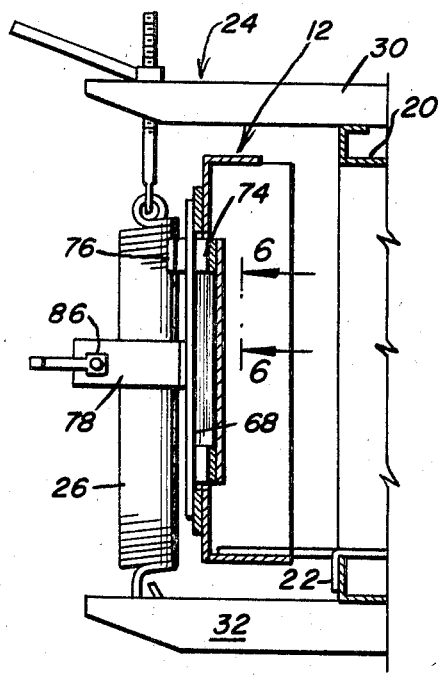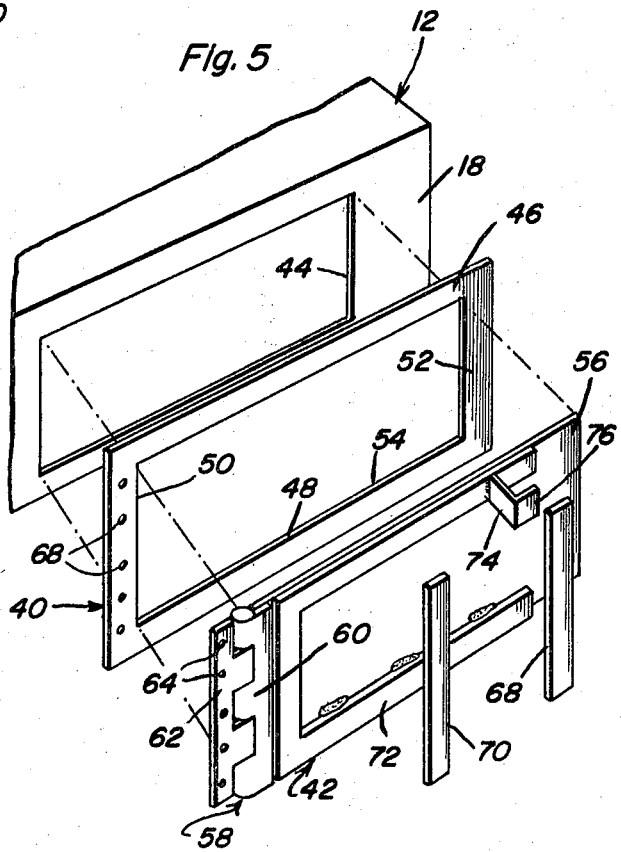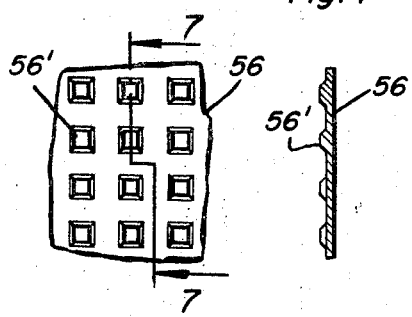
Earl M. Hoke
INVENTOR.

United States Patent Office 3,424,081
Patented Jan. 28, 1969

3,424,081
BALE COMPACTING ATTACHMENT FOR BALERS
Earl M. Hoke, Plevna, Mont. 59344
Filed Jan. 10, 1966, Ser. No. 519,619
U.S. Cl. 100—192
Int. Cl. B30b 1/00
4 Claims

ABSTRACT OF THE DISCLOSURE

A pair of flap members mounted in elongated openings formed in opposite side walls of the bale discharge chute of a baler including longitudinally extending wall portions of the discharge chute supported at their ends adjacent the inlet end of the chute for swinging movement of their ends adjacent the discharged end of the chute toward and away from each other and provided with means for yieldingly urging the free swinging ends toward each other, the flap members extending generally between opposite side marginal portions of the elongated wall portions adjacent the free swinging ends of the elongated wall portions and having their ends adjacent the inlet end of the chute pivotally supported from the chute for movement of the free ends of the flap members adjacent the outlet end of the chute toward and away from each other, separate means being provided for each of the flap members for yieldingly urging the free ends of the latter inwardly of the corresponding wall portion of the chute.

---

This invention relates to a novel and useful attachment for balers and for more specifically to an attachment adapted to assist in compacting the material which is to be baled in a manner such that a more uniformly compressed bale may be obtained.

There are numerous balers presently being manufactured which include bale chamber rails disposed on opposite sides of the bale chamber and which are adjustable relative to each other and conventionally spring-urged toward each other in a manner such that the material to be baled is somewhat evenly compacted before being finally tied in a bale. However, it has been found that under certain adverse conditions conventional balers are not able to form and tie a bale in the desired manner. The size of the windrows (heavy and light) from which a baler is receving material to be baled greatly affects the density of the bales formed by conventional balers even though the latter are provided with spring-mounted bale chamber rails for more uniformly compacting the material to be baled before each bale is tied. Alternating light and heavy windrows cannot only make a considerable difference in the density of individual bales formed by material from these windrows, but the baling action of the baler can be adversely affected if the baler has been set to handle heavy windrows and a light windrow is suddenly encountered or the windrows have alternating heavy and light portions. Such alternating light and heavy windrow portions can cause a conventional baler to develop operating malfunctions in its knotting operations, to fail to form the bale in a manner so that the twine binding the bale cannot slip, and other operating malfunctions. In addition to the size or weight of the windrows effecting different operations of conventional balers, the moisture content of the material to be baled and the heaviness of the material to be baled must also be compensated for in order to properly form and tie bales of uniform density.

It is accordingly the main object of this invention to provide a bale compacting attachment for conventional balers which will be operative to enable balers to more readily handle windrows including heavy and light portions, moist or dry hay, and light or heavy hay and form uniformly compacted bales.

Another object of this invention, in accordance with the immediately preceding object, is to provide a bale compacting attachment for balers which may be readily attached to existing balers in addition to being incorporated into the manufacture of new balers.

Still another object of this invention is to provide an attachment which may be utilized on various types of balers.

A final object of this invention to be specifically enumerated herein is to provide a baler attachment in accordance with the preceding objects which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is an enlarged fragmentary horizontal sectional view taken substantially upon the plane indicated by the section line 3—3 of FIGURE 1;

FIGURE 4 is a fragmentary vertical sectional view taken substantially upon the plane indicated by the section line 4—4 of FIGURE 3;

FIGURE 5 is an exploded perspective view of several of the components of the bale compacting attachment;

FIGURE 6 is an enlarged fragmentary side elevational view of a central portion of one of the flap portions of the instant invention illustrating the manner in which its inner surface is roughened; and FIGURE 7 is a fragmentary sectional view taken substantially upon the plane indicated by the section line 7—7 of FIGURE 6.

Figure 1:
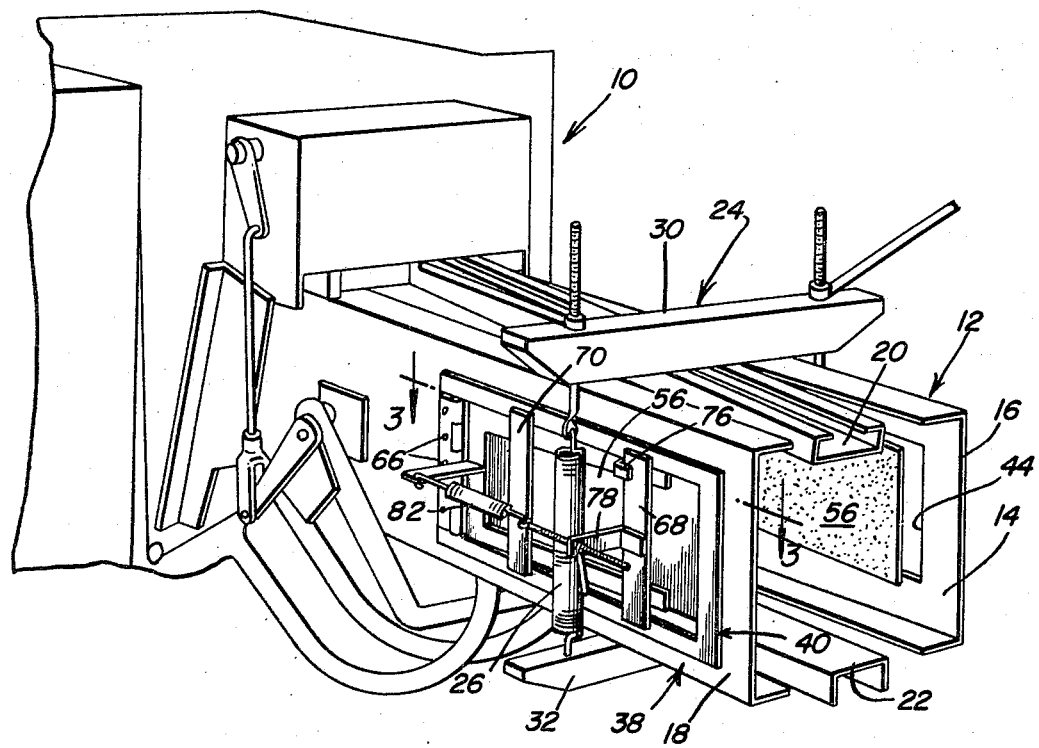
FIGURE 1 is a perspective view of the discharge portion of a baler shown with the attachment of the instant invention operatively associated therewith.

Referring now more specifically to the drawings, the numeral 10 generally designates a baler including a bale chute generally referred to by the reference numeral 12 defining a bale chamber 14 extending therethrough. The chute 12 includes a pair of upstanding opposite side walls 16 and 18 and a pair of upper and lower relatively pivotable bale chamber rails 20 and 22. The rails 20 and 22 are interconnected by means of a spring assembly generally referred to by the reference numeral 24 and including a pair of expansion springs 26 and 28 interconnected between corresponding opposite end portions of upper and lower transverse members 30 and 32 whereby the ends of the chamber rails 20 and 22 adjacent the discharge end of the chamber 14 are yieldingly urged together for the purpose of compacting the material to be baled in the chute 12.

Figure 2:
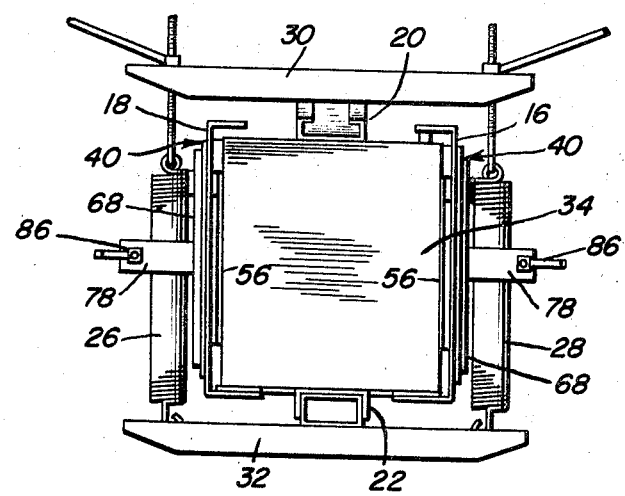
FIGURE 2 is an end elevational view of the discharge end of the assemblage illustrated in FIGURE 1.

The preceding description is to be understood as representative of conventional baling machines and it will be noted that the material of which the bale 34 illustrated in FIGURE 2 of the drawings is constructed is compacted by the chamber rails 20 and 22 in a vertical plane only, independently of the ram (not shown) of the baler 10 which compresses the bale material longitudinally of the chute 12. While the spring-urged chamber rails 20 and 22 function adequately when the tension of the springs 26 and 28 is properly adjusted and the material to be baled is fed to the baler in a uniform condition as to heaviness, dampness and rate, should either one or more of these factors vary significantly during operation of the baler 10, it has been found that conventional balers of this type will not form uniformly compacted bales.

The bale compacting attachment of the instant invention is generally referred to by the reference numeral 38 and may be seen to best advantage from a comparison of FIGURES 1, 3 and 5 as including a main support frame generally referred to by the reference numeral 40 and a flap assembly generally referred to by the reference numeral 42.

Although only one attachment 38 could be utilized with improved results, it has been found that the best results can be obtained by utilizing two of the attachments 38, one supported from each of the side walls 16 and 18. Further, in preparation for mounting the attachments 38 on the side walls 16 and 18, each of the side walls has an elongated generally horizontally disposed opening 44 formed therein. Each frame 40 is generally rectangular in configuration including a pair of longitudinal members 46 and 48 interconnected at corresponding opposite ends by means of integral transverse members 50 and 52. The inner periphery 54 of each frame 40 is of a size corresponding to the corresponding opening 44 and each frame 40 is secured to the corresponding side wall of the chute 12 in any convenient manner such as by welding.

Each of the flap assemblies 42 includes a generally rectangular flap portion 56 including a hinge assembly 58. Each hinge assembly 58 includes a first hinge leaf 60 secured to one transverse end edge portion of the flap portion in any convenient manner such as by welding and a second hinge leaf 62 suitably apertured as at 64 for the reception of fasteners 66 therethrough threadedly engaged in threaded bores 68 formed through the corresponding transverse member 50.

It will be noted that each hinge leaf 60 is secured over the outer surface of the corresponding end of the associated flap portion 56 and therefore that the flap portion 56, when disposed substantially parallel to the corresponding side wall of the chute 12, will be substantially coplanar with that corresponding side wall and form a continuation of the inner surface thereof, The frame 40 includes a pair of transverse members 68 and 70 extending between the longitudinal members 46 and 48 intermediate the transverse members 50 and 52 and the flap portion 56 includes a generally U-shaped stiffening member 72 which is secured thereto in any convenient manner such as by welding and which has supported therefrom an L-shaped abutment bracket 74 including an angulated end flange 76. In addition, the transverse brace or member 68 has an apertured anchor bracket 78 secured thereto and a second apertured anchor bracket 80 is carried by the flap portion 56 adjacent the hinge assembly 58, the anchor bracket 80 being secured to the stiffening member 72.

As can best be seen from FIGURES 1 and 3 of the drawings the end flanges 76 are engageable with the transverse brace or member 68 to limit inward swinging movement of the free end portions of the flap portions 56. In addition, an expansion spring 82 is secured between each pair of anchor brackets 78 and 80 and includes a threaded anchor screw 84 attached to one end which is passed through the corresponding apertured anchor bracket 78 and has a threaded abutment 86 engaged therewith. Accordingly, the tension of the springs 82 may be adjusted by adjusting the threaded abutment members 86 along the anchor screws 84. In operation, the free end edge portions of the flap portions 56 are urged toward their innermost limit positions defined by the end flanges 76 by means of the expansion springs 82. As the material to be baled is moved along the chute 12 before each bale is tied, this material is compacted not only in a vertical plane by the chamber rails 20 and 22 but by means of the flap portions 56 of the attachments 38. It is to be noted that the transverse width of the flap portions 56 is substantially greater than the transverse width of the chamber rails 20 and 22 and that the flap portions 56 of each pair of attachments 38 applied to the bale chute of a baler are individually spring-urged toward their innermost limit positions and not by means of spring means interconnecting the two flap portions 56 such as is the case with the chamber rails 20 and 22.

A final and important feature of this invention to be specifically described herein is the roughened inner surface of the flap portions 56. As can best be seen in FIGURES 6 and 7, the flap portions 56 include a plurality of inwardly projecting projections 56' and it is to be understood that these projections 56' frictionally grip the sides of the bale 34 passing therebetween so as to provide greater resistance to movement of the bale 34 outwardly of the discharge end of the chute 12 without applying excessive side pressure to the bale 34.

As previously set forth, although movement of the bale 34 outwardly of the discharge end of the chute 12 could be further retarded in a conventional baler such as that generally designated by the reference numeral 10 by increasing the convergence of the rails 22 and 20, excessive "pinching" caused by an overage of convergence of the rails 20 and 22 can cause the knotting assembly of the baler 10 to malfunction and excessive binding of the string by which the bale 34 is to be tied. Accordingly, in order to provide the desired additional resistance to movement of the bale 34 outwardly of the outlet end of the chute 12, the flap portions 56 are provided and their inner surfaces are provided with the projections 56' whereby a controlled amount of resistance of movement of the bale 34 will be afforded without excessively "pinching" the bale.

Inasmuch as the flap portions 56 are provided with the projections 56', the expansion springs 82 need not be excessively strong and therefore are capable of operating efficiently throughout a greater range of variance of the condition of the hay being baled without adjusting the tension of the springs 82.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a baler of the type including an elongated bale chamber forming chute including a forward end and a rear outlet end and defined between first and second pairs of generally parallel opposing elongated wall defining members extending longitudinally of said chute, a first pair of said wall defining members being supported at their forward ends for swinging movement of their rear ends toward and away from each other, means operatively connected to said first pair of wall defining members yieldingly urging the latter toward rearwardly convergent positions, said second pair of wall defining members being generally planar, parallel and stationarily positioned relative to each other, a pair of aligned elongated openings formed in and extending longitudinally of said second pair of wall defining members and disposed completely rearward of the forward ends of the first pair of members and closely adjacent the rear ends thereof, a pair of flaps disposed in said openings and substantially filling the latter, said flaps being pivotally supported at their forward ends from said second pair of members for angular adjustment between first positions disposed generally in the planes of said openings and second positions with the rear edge portions of said flaps swung inwardly of said second pair of members, coacting means carried by said second pair of members and said flaps defining limits of oscillatory movement of said flaps to movement between said first and second positions, and means independent of the first-mentioned means operatively connected between said flaps and said chute yieldingly urging said flaps toward said second positions thereof, said flaps being freely movable independent of each other and completely separately biased toward said second positions thereof by the last-mentioned means.

2. The combination of claim 1 including a frame secured to each member of said second pair of members and extending about said openings, said flaps being pivotally secured to said frames.

3. The combination of claim 2 wherein said coacting means includes at least one transverse member secured across each of said frames generally paralleling said axes and engageable by said flaps to limit swinging movement of the latter to said first positions.

4. The combination of claim 1 including an outwardly projecting arm carried by each of said flaps, said flaps including outer end portions abuttingly engageable with said braces to limit swinging movement of said flaps to said second positions.

References Cited

UNITED STATES PATENTS

| 1,065,648 | 6/1913 | Wygant | 100—191 X |
| 2,470,278 | 5/1949 | West et al. | 100—191 |
| 2,610,575 | 9/1952 | Wuertz | 100—192 |
| 2,791,172 | 5/1957 | Russell | 100—192 |
| 3,212,433 | 10/1965 | Raab | 100—192 X |

FOREIGN PATENTS 1,203,521  10/1965  Germany.

LOUIS O. MAASSEL, *Primary Examiner.*